(12) United States Patent
Kimura et al.

(10) Patent No.: US 7,856,103 B2
(45) Date of Patent: Dec. 21, 2010

(54) MICROCONTROLLER AND AUTHENTICATION METHOD BETWEEN THE CONTROLLERS

(75) Inventors: Toshio Kimura, Kanagawa (JP); Naofumi Ozawa, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 912 days.

(21) Appl. No.: 11/648,691

(22) Filed: Jan. 3, 2007

(65) Prior Publication Data

US 2007/0160204 A1 Jul. 12, 2007

(30) Foreign Application Priority Data

Jan. 5, 2006 (JP) ............................. 2006-000919

(51) Int. Cl.
*H04L 9/00* (2006.01)
*H04L 9/32* (2006.01)
(52) U.S. Cl. .............................. 380/44; 380/46; 713/189
(58) Field of Classification Search .................. 380/277, 380/44, 46; 713/184, 189, 193–194; 708/250, 708/255
See application file for complete search history.

(56) References Cited

U.S. PATENT DOCUMENTS 7,421,742 B2 9/2008 Kitani et al.
7,590,865 B2 * 9/2009 Han et al. .................. 713/189

FOREIGN PATENT DOCUMENTS

CN 1692599 A 11/2005
JP 2003-318894 11/2003

OTHER PUBLICATIONS

Chinese Office Action dated Aug. 9, 2010 with an English translation.

\* cited by examiner

*Primary Examiner*—Hosuk Song
(74) *Attorney, Agent, or Firm*—McGinn IP Law Group, PLLC (57) ABSTRACT

A microcontroller includes a program memory configured to store a program group and a first encryption key; a CPU; and an identification (ID) storage section configured to store an identification data peculiar to a user of the microcontroller. The CPU executes the program group to generate a second encryption key based on the identification data and the first encryption key and to encrypt a random number with the second encryption key.

20 Claims, 5 Drawing Sheets

Fig. 1

MICROCONTROLLER AND AUTHENTICATION METHOD BETWEEN THE CONTROLLERS

BACKGROUND OF THE INVENTION

1. Field of the Invention

The present invention relates to a microcontroller, particularly to a microcontroller which performs authentication by using an encrypted random number.

2. Description of the Related Art

In apparatuses using replaceable accessories such as a battery of a mobile phone and an ink cartridge of a printer, there is a case that an unauthorized accessory and an ordinary accessory are used even though an authorized accessory should be preferably used. In order to prevent the usage of accessories other than authorized accessories as described above, there is a case that authentication is performed between a main body and an accessory. As one of the techniques related to the authentication between the main body and the accessory, the same random number is encrypted between an authenticating side and an authenticated side by an encryption program including the same encryption key and a comparison is performed to confirm coincidence.

A conventional technique to encrypt a random number is described in Japanese Laid Open Patent Application (JP-P2003-318894A) in which an authentication method between apparatuses of a challenge and response system. In this conventional authentication method, a challenge data is transmitted to a terminal from a server, and a response data decrypted from the challenge data is transmitted from the terminal to the server. Further, whether the response data is data decrypted from the challenge data is determined on the basis of encryption performed in the server. When the determination result is affirmative, this authentication method updates a parameter used for both encryption and decryption to a new parameter which is set as a parameter to be used in the next authentication.

If a conventional technique is applied to an application system on which a microcontroller is mounted, it is possible to perform encryption in an accessory other than an authorized accessory by making a copy of entire data of a program memory in which a user program is stored, because an encryption key used for encrypting a random number is directly written into the program or stored as data in a memory which is simultaneously used for storing the program. That is, if an authentication program is illegally obtained and the program is written into a program memory of the microcontroller which is composed of a flash memory or the like, an operation is performed even in an unauthorized accessory, causing a problem of a counterfeit product to be undetectable. In this way, if a microcontroller written by the same program is mounted on a counterfeit product imitating the authorized accessory, the same operation with the authorized accessory is exhibited.

SUMMARY OF THE INVENTION

In an aspect of the present invention, a microcontroller includes a program memory configured to store a program group and a first encryption key; a CPU; and an identification (ID) storage section configured to store an identification data peculiar to a user of the microcontroller. The CPU executes the program group to generate a second encryption key based on the identification data and the first encryption key and to encrypt a random number with the second encryption key.

Here, the CPU may execute a random number generating program of the program group to generate the random number. Also, the microcontroller may further include a random number generating circuit configured to generate the random number. Also, the microcontroller may further include a port configured to receive the random number.

Also, the CPU may execute the program group to compare the random number encrypted with the second encryption key and an encrypted random number received from an external device and to output the comparison result.

Also, the program memory and the ID storage section may be constituted by a nonvolatile memory. In this case, the microcontroller may further include a control section configured to carry out an erasing operation and a writing operation to the program memory in response to a write request of a program into the program memory. The control section may erase the identification data from the ID storage section when the erasing operation is carried out to the program memory.

Also, the program group may include a first encryption key supplying program adapted to supply the first encryption key; a second encryption key generating program adaptive to acquire the first encryption key and the identification data and to generate the second encryption key based on the first encryption key and the identification data; and an encrypting program adapted to encrypt the random number with the second encryption key. In this case, the program group may further include a comparing program adapted to compare the random number encrypted using the second encryption key and an encrypted random number received from an external device and to output the comparison result.

In another aspect of the present invention, an authentication method between first and second microcontrollers, is achieved by supplying a first encryption key through execution of a first encryption key supplying program stored in a first program memory of the first microcontroller; by holding a first identification data peculiar to the first microcontroller in a first identification (ID) storage section of the first microcontroller; by generating a second encryption key in the first microcontroller based on the first identification data and the first encryption key; by encrypting a random number with the second encryption key in the first microcontroller to generate a first encrypted random number; by receiving a second encrypted random number from the second microcontroller; and by comparing the first encrypted random number and the second encrypted random number to output the comparing result.

Here, the authentication method may be achieved by further reading the random number from the first program memory. In this case, the authentication method may be achieved by further generating the random number to store in the first program memory. The generating the random number is achieved by executing a random number generating program stored in the first program memory to generate the random number.

Also, the program memory and the ID storage section are constituted by a nonvolatile memory, and the microcontroller may be achieved by further carrying out an erasing operation and a writing operation to the first program memory in response to a write request of a program into the first program memory; and carrying out the erasing operation to the ID storage section in response to the write request.

Also, the authentication method may be achieved by further supplying a third encryption key through execution of a second encryption key supplying program stored in a second program memory of the second microcontroller; holding a second identification data peculiar to the second microcontroller in a second identification (ID) storage section of the second microcontroller; generating a fourth encryption key in the second microcontroller based on the second identification data and the third encryption key; encrypting the random number from the first microcontroller with the fourth encryption key in the second microcontroller to generate the second encrypted random number; and transmitting the second encrypted random number to the first microcontroller. In this case, the authentication method may be achieved by further supplying power to the second microcontroller when a unit containing the second microcontroller is installed to a unit containing the first microcontroller. The supplying a third encryption key may be performed after the power is supplied to the second microcontroller.

Also, the authentication method may be achieved by further supplying a third encryption key through execution of a second encryption key supplying program stored in a second program memory of the second microcontroller; holding a second identification data peculiar to the second microcontroller in a second identification (ID) storage section of the second microcontroller; generating a fourth encryption key in the second microcontroller based on the second identification data and the third encryption key; encrypting the random number from the first microcontroller with the fourth encryption key in the second microcontroller to generate the second encrypted random number; and transmitting the second encrypted random number to the first microcontroller. In this case, the authentication method may be achieved by further supplying power to the first microcontroller when a unit containing the second microcontroller is installed to a unit containing the first microcontroller. The supplying a first encryption key may be performed after the power is supplied to the first microcontroller.

DESCRIPTION OF THE PREFERRED EMBODIMENTS

Hereinafter, a microcontroller of the present invention will be described in detail with reference to the attached drawings.

Figure 1:
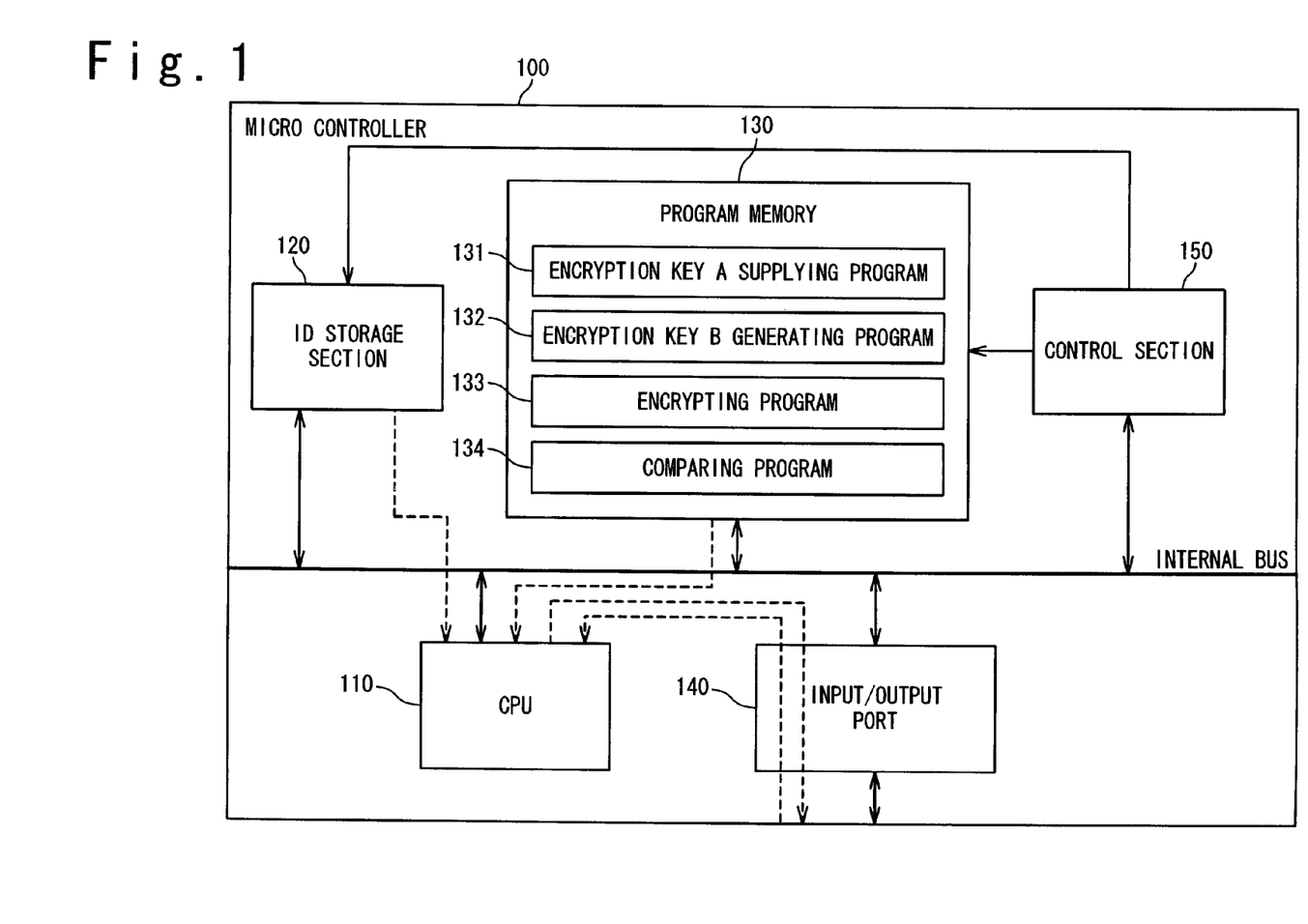
FIG. 1 is a block diagram showing the configuration of a microcontroller according to the present invention.

FIG. 1 is a block diagram showing a configuration of a microcontroller 100 according to the first embodiment of the present invention. Referring to FIG. 1, the microcontroller 100 of the first embodiment includes a CPU 110, an ID storage section 120, a program memory 130 and an input/output port 140.

The CPU 110 controls each of sections in the microcontroller 100. The CPU 110 also generates a random number required for encryption in the microcontroller 100. At this time, the CPU 110 generates a random number by executing a random number generating program (not shown) stored in the program memory 130. However, for a practical use, a random number generating function through execution of the program by the CPU itself or a hardware function such as a random number generating circuit (not shown) may also be used to generate the random number. That is, the random number may be generated in any methods. Also, the random number may be received from an external device. The generated or received random number may be stored in the program memory.

The ID storage section 120 is a storage region provided in the microcontroller 100, and is accessed by a circuit or a program in the microcontroller. The ID storage section 120 also stores inherent identification data (ID) determined for each customer. In the ID storage section 120, an ID inherent in a target customer (ex. 58679) is written to be shipped to a specific customer. In the ID storage section 120 for a product shipped to an ordinary customer, an initial value, e.g., all zero is written. The ID storage section 120 is readable but unrewritable by any programs in the program memory 130. The ID storage section 120 is rewritable only in an exclusive mode in a manufacturing process of a manufacturer. The ID storage section 120 is a nonvolatile memory if the program memory 130 is a nonvolatile memory and the programs are rewritable.

In the program memory 130, user programs are written therein. The programs include an encryption key A supplying program 131, an encryption key B generating program 132, an encrypting program 133 and a comparing program 134. However, for a practical use, the functions of the encryption key A supplying program 131, encryption key B generating program 132, encrypting program 133 and comparing program 134 may also be achieved by a hardware circuit. Also, the program may include the random number generating program.

The encryption key A supplying program 131 is a program for supplying a first encryption key A and holding it in the program memory. The encryption key B generating program 132 is a program for newly generating an encryption key B based on the encryption key A supplied by the encryption key A supplying program 131 and the inherent identification data (ID) stored in the ID storage section 120. The generation of the encryption key B may be notified to an external device. The encrypting program 133 is a program for encrypting a random number based on the encryption key B. The comparing program 134 is a program for comparing the random number encrypted based on the encryption key B, i.e., a first encrypted random number with a second encrypted random number obtained from another microcontroller and outputs the comparison result.

The program memory 130 is a mask ROM or a nonvolatile memory. If the program memory 130 is a nonvolatile memory such as a flash memory, the ID storage section 120 is preferably a nonvolatile memory. This is because it makes it possible to perform an erasing operation to the ID storage section 120 when the user program in the program memory 130 is rewritten. More details will be described below.

If the program memory 130 is a nonvolatile memory, the first microcontroller 100 further includes a control unit 150.

The control section 150 performs a write/erase control to the program memory 130. Specifically, in the write operation, the control section 150 generates a voltage required for the write operation to the nonvolatile memory and performs the write control in accordance with a write address and data to be written. Also, the control section 150 generates a voltage required for an erasing operation to the nonvolatile memory and performs the erase operation. If a rewrite request is supplied to the first microcontroller 100 from a program writing device (not shown) in order to rewrite the content of the program memory 130, the control section 150 controls an erasing operation to the program memory 130 and the ID storage section 120 before writing a new program. That is, the control section 150 erases or writes the program memory 130 in response to the rewrite request, and simultaneously initializes the ID held in the ID storage section 120, e.g., writes zero in all addresses.

If the program memory 130 is a mask ROM, there is no possibility of a program change.

The input/output port 140 is a port for performing communication with an external device. The input/output port 140 is used for acquiring an encrypted random number generated by another microcontroller and for outputting the comparison result from the comparing program 134. If a random number used for encryption is not generated in the microcontroller 100 internally, the input/output port 140 is used to acquire the random number from the external device.

Figure 2:
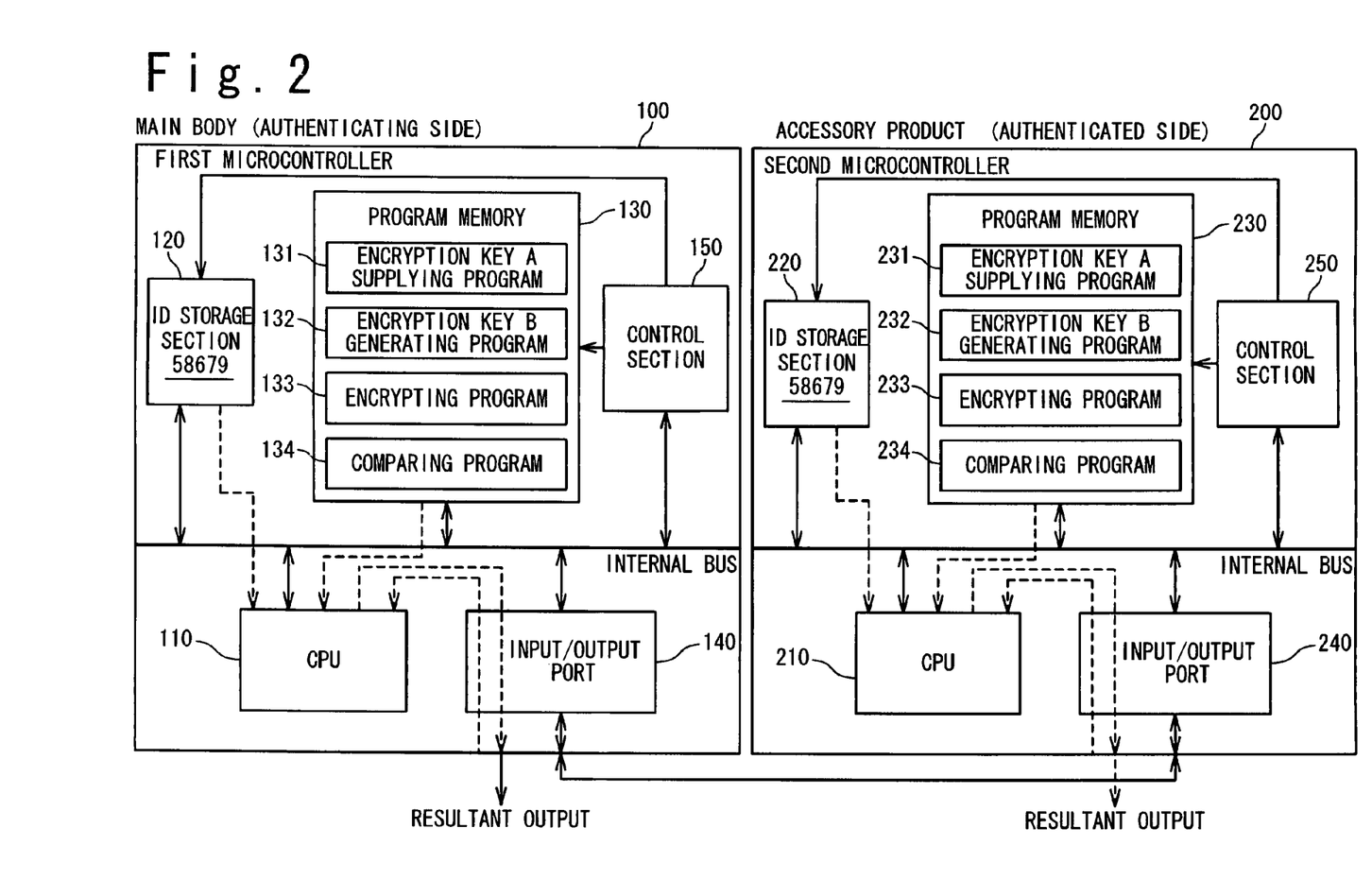
FIG. 2 is a block diagram showing the configuration of a main body (authenticating side) and an accessory (authenticated side)

As shown in FIG. 2, an authentication system using the microcontroller of the present invention has a first microcontroller 100 and a second microcontroller 200. The first microcontroller 100 is connected to the second microcontroller 200 by a communication line.

In the first embodiment of the present invention, it is considered that the first microcontroller 100 is a main body (authenticating side) and the second microcontroller 200 is an accessory (authenticated side), as shown in FIG. 2. Both the first microcontroller 100 and the second microcontroller 200 have the same configuration and function as those of the microcontroller shown in FIG. 1. In order to identify the configuration between the first microcontroller 100 and the second microcontroller 200, the second microcontroller 200 is composed of a CPU 210, an ID storage section 220, a program memory 230 and an input/output port 240. That is, in the second microcontroller 200, the CPU 110, the ID storage section 120, the program memory 130 and the input/output port 140 in FIG. 1 are read as the CPU 210, the ID storage section 220, the program memory 230 and the input/output port 240, respectively.

The CPU 210 controls each of sections in the microcontroller. Because the second microcontroller 200 acquires the random number from the first microcontroller 100, the CPU 210 does not generate a random number.

The ID storage section 220 stores inherent identification data (ID) determined for each customer. This identification data is same as identification data stored in the ID storage section 120 in the first microcontroller 100. That is, the ID storage section 120 and the ID storage section 220 store the same identification data.

In the program memory 230, user programs are written. The programs include an encryption key A supplying program 231, an encryption key B generating program 232, an encrypting program 233 and a comparing program 234. The encryption key A supplying program 231, the encryption key B generating program 232 and the encrypting program 233 are same as the encryption key A supplying program 131, the encryption key B generating program 132 and the encrypting program 133 in FIG. 1, respectively. However, for a practical use, the encryption key A supplying program 231, the encryption key B generating program 232, the encrypting program 233 and the comparing program 234 may be achieved by hardware circuits.

Although the comparing program 234 may be same as the comparing program 134 in FIG. 1, the comparing program 234 transmits a random number encrypted by the encrypting program 233 (a second encrypted random number) to the first microcontroller 100, if respective random numbers are compared on the main body side (authenticating side). If the first microcontroller 100 can acquire the encrypted random number from the second microcontroller 200 through acquisition of the second encrypted random number by using the comparing program 134 or through transmission of the second encrypted random number by using the encrypting program 233, the comparing program 234 may be omitted.

If the program memory 230 is a nonvolatile memory, the second microcontroller 200 further includes a control unit 250. The control unit 250 is same as the control section 150 in FIG. 1.

The input/output port 240 is a port for performing communication with an external device. The input/output port 240 is used to acquire the random number from the first microcontroller 100 and transmit the second encrypted random number to the first microcontroller 100.

Although the first microcontroller 100 is the main body (authenticating side) and the second microcontroller 200 is the accessory (authenticated side) in the first embodiment of the present invention shown in FIG. 2, the accessory may be the authenticating side and the main body may be the authenticated side for a practical use. This is the authentication system according to the second embodiment of the present invention.

In the third embodiment of the present invention, it is also possible to perform authentication by both the main body and the accessory. The authentication performed in both the main body and the accessory allows a further firm security to be secured. In this case, the first microcontroller 100 and the second microcontroller 200 perform the same operation. That is, the CPU 210 in the second microcontroller 200 generates the random number. At this time, the CPU 210 generates the random number by executing a random number generating program (not shown) stored in the program memory 230. However, the random number may be generated by a random number generating function of the CPU itself and a hardware function such as a random number generating circuit (not shown). The random number may be obtained by any methods. For example, it is possible to acquire the random number from an external random number generating device (not shown) in both the first microcontroller 100 and the second microcontroller 200. In this case, the first microcontroller 100 and the second microcontroller 200 have a plurality of input/output ports not only for communication with each other but also for communication with the external random number generating device.

Moreover, the second microcontroller 200 acquires an encrypted random number from the first microcontroller 100 (the first encrypted random number) and compares the random number decrypted from the encrypted random number with the random number generated in the second microcontroller 200 by the comparing program 234.

Figure 3:
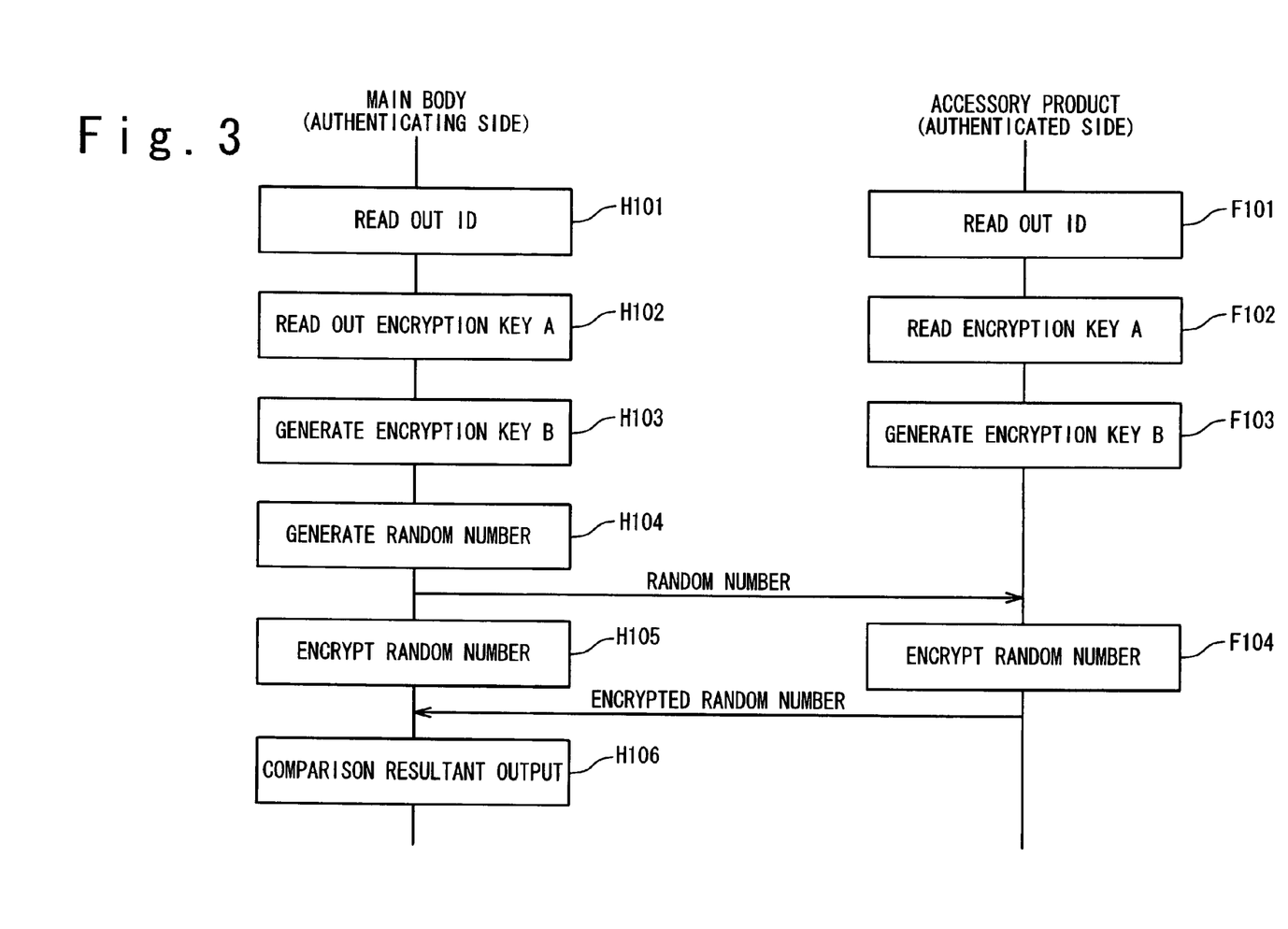
FIG. 3 is a flowchart showing a basic operation of the present invention.

Next, referring to FIG. 3, an operation of the authentication system according to the present invention will be described below. As an example, it is assumed that the first microcontroller 100 is the main body (authenticating side) and the second microcontroller 200 is the accessory (authenticated side) here.

(1) Step H101

The CPU 110 reads an identification data (ID) from the ID storage section 120.

(2) Step H102

The CPU 110 reads the encryption key A from the encryption key A supplying program 131 in the program memory 130.

(3) Step H103

The CPU 110 generates the encryption key B based on the encryption key A and the ID by using the encryption key B generating program 132.

(4) Step F101

The CPU 210 reads an identification data (ID) from the ID storage section 220.

(5) Step F102

The CPU 210 reads the encryption key A from the encryption key A supplying program 231 in the program memory 230.

(6) Step F103

The CPU 210 generates the encryption key B based on the encryption key A and the ID by using the encryption key B generating program 232.

(7) Step H104

The CPU 110 generates a random number to output (notify) the accessory (the second microcontroller 200).

(8) Step H105

The CPU 110 encrypts the random number with the encryption key B by using the encrypting program 133 to generate a first encrypted random number.

(9) Step F104

The CPU 210 encrypts the random number received from the main body (the first microcontroller 100) with the encryption key B by using the encrypting program 233 to generate a second encrypted random number, and then transmits the second encrypted random number to the main body (the first microcontroller 100).

(10) Step H106

The CPU 110 compares the first encrypted random number with the second encrypted random number by using the comparing program 134 to output the comparison result.

The timing to start the above operation (operation starting trigger) is a time of starting the main body and the accessory (a time of power on/off), a time of connecting the accessory to the main body, a time of receiving a request signal from an external device, or periodically. The accessory may start the operation after receiving the random number from the main body. Also, in both the main body and the accessory, the operations to the generation of the encryption key B may be performed when the identification data (ID) and the program are set previously. However, a practical use is not limited to the above examples.

Next, two examples of the first embodiment and the second embodiment will be described below.

Figure 4:
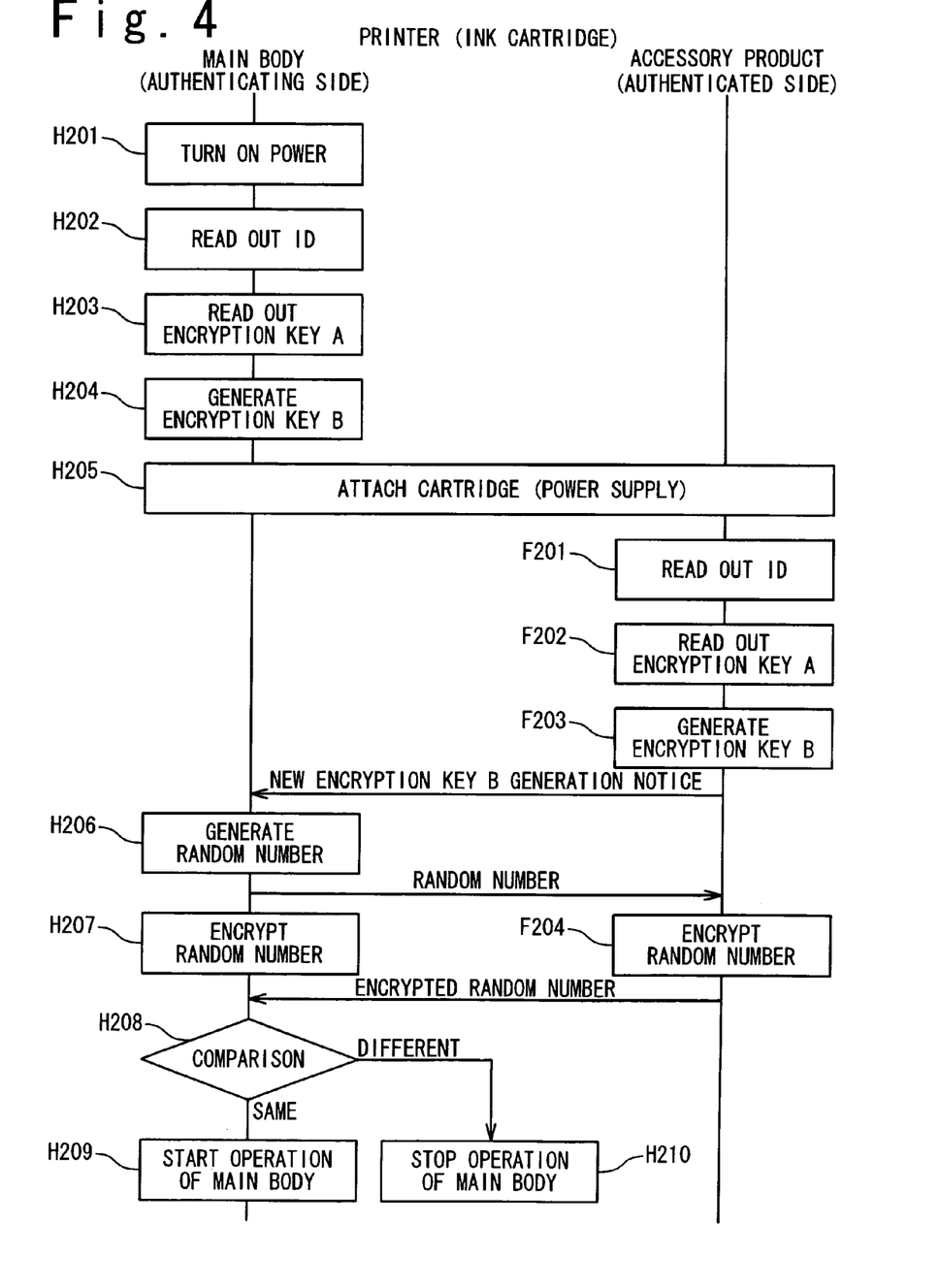
FIG. 4 is a flowchart of an authentication operation in the case of a printer and a cartridge.

Referring to FIG. 4, the authentication system in the first embodiment of a printer (main body) and an ink cartridge (accessory) will be described.

(1) Step H201

A power supply is turned on in the printer main body.

(2) Step H202

The microcontroller on the main body side reads the identification data (ID) on the main body side.

(3) Step H203

The microcontroller on the main body side reads the encryption key A on the main body side.

(4) Step H204

The microcontroller on the main body side generates the encryption key B based on the encryption key A and the identification data (ID).

(5) Step H205

Thereafter, the microcontroller on the main body side recognizes the cartridge to be mounted on the main body and supplies the power to the cartridge.

(6) Step F201

When the power supplied is turned on, the microcontroller on the cartridge side reads the identification data (ID) on the cartridge side.

(7) Step F202

The microcontroller on the cartridge side reads the encryption key A on the cartridge side.

(8) Step F203

The microcontroller on the cartridge side generates the encryption key B based on the encryption. key A and the identification data (ID), and then transmits a notice of generation of the encryption key B to the main body.

(9) Step H206

In response to the notice of generation of the encryption key B, the microcontroller on the main body side generates a random number and transmits it to the cartridge.

(10) Step F204

The microcontroller on the cartridge side encrypts the random number received from the main body based on the encryption key B to generate the second encrypted random number, and transmits the second encrypted random number to the main body.

(11) Step H207

The microcontroller on the main body side encrypts the random number based on the encryption key B to obtain the first encrypted random number.

(12) Step H208

The microcontroller on the main body side compares the first encrypted random number with the second encrypted random number.

(13) Step H209

If the result indicates coincidence, the main body starts operating as a printer.

(14) Step H210

If the result does not indicate coincidence, the main body suspends to operate as the printer.

Figure 5:
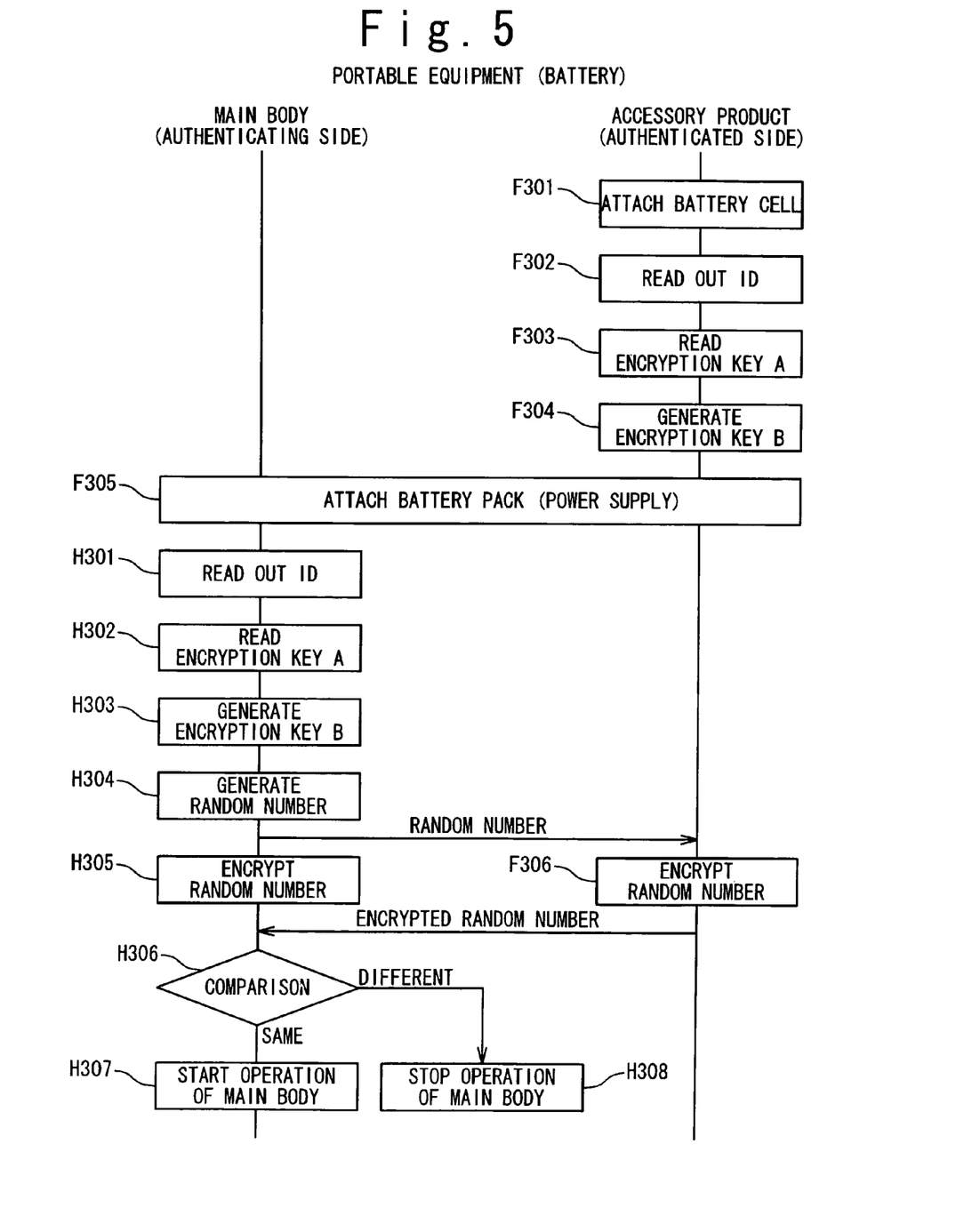
FIG. 5 is a flowchart of an authentication operation in the case of a portable equipment and a battery.

Next, referring to FIG. 5, the operation of the authentication system in the second embodiment will be described in case of a portable terminal (main body) and a battery (accessory).

(1) Step F301

A battery cell is connected to or mounted in a battery pack.

(2) Step F302

The microcontroller on the battery side reads the identification data (ID) on the battery side.

(3) Step F303

The microcontroller on the battery side reads the encryption key A on the battery side.

(4) Step F304

The microcontroller on the battery side generates the encryption key B based on the encryption key A and the identification data (ID).

(5) Step F305

Thereafter, the battery pack is mounted on the main body side so that the battery cell provides power to the main body.

(6) Step H301

When the power supply is turned on, the microcontroller on the main body side reads the identification data (ID) on the main body side.

(7) Step H302

The microcontroller on the main body side reads the encryption key A on the main body side.

(8) Step H303

The microcontroller on the main body side generates the encryption key B based on the encryption key A and the identification data (ID).

(9) Step H304

The microcontroller on the main body further generates the random number and transmits it to the battery pack.

(10) Step F306

The microcontroller on the battery side encrypts the random number received from the main body by using the encryption key B to generate the second encrypted random number, and transmits the second encrypted random number to the main body.

(11) Step H305

The main body encrypts the random number by using the encryption key B to obtain the first encrypted random number.

(12) Step H306

The main body compares the first encrypted random number with the second encrypted random number.

(13) Step H307

If the result indicates coincidence, the main body starts operating as the portable equipment.

(14) Step H308

If the result does not indicate coincidence, the main body suspends to operate as the portable equipment.

Here, a case that program of the microcontroller is illegally acquired will be described. In this case, the ID written into the ID storage section of the main body is inherent in a customer.

When an authorized program has been written in the microcontroller in the accessory side (a customer limited product), that is, in case of normal usage, the main body and the accessory are supposed to use the same encryption key B prepared on the basis of the first encryption key A and the ID, and the same random number, thereby the encrypted random number will remain the same.

However, if an illegally acquired program is copied into a program memory of the microcontroller for an ordinary customer other than a specific customer without any processing, the ID of the microcontroller mounted on the counterfeit product is initialized, e.g., is all set to zeros which is different from the customer inherent ID. Thus, the encryption key B is different. As a result, random numbers encrypted in the main body and the accessory are different from each other. Thus, it makes it possible to confirm that the accessory connected to the main body is a counterfeit product.

If the program memory of the microcontroller is a nonvolatile memory, a means for acquiring the ID with malicious intent by writing and executing a simple program for reading and outputting the ID is considered. However, because an erasing operation and a writing operation to the nonvolatile memory are carried when a data or a program is written in the nonvolatile memory, the data held in the ID storage section can be initialized, which prevents the usage of the above means.

As described above, the microcontroller according to the present invention includes the CPU for generating the random number by executing a random number generating program or a hardware function, the ID storage section for storing inherent identification data, and the first program memory for storing the first encryption key and generating the second encryption key on the basis of the identification data and the first encryption key so as to store the program for encrypting the random number based on the second encryption key.

In the authentication system using the microcontroller of the present invention, the first microcontroller of the main body (authenticating side) and the second microcontroller of the accessory (authenticating side) are used. The first microcontroller is connected to the second microcontroller by a communication line.

The first microcontroller includes the program memory, the ID storage section and the CPU. The second microcontroller includes the program memory and the ID storage section. If a nonvolatile memory is used for the ID storage sections in the respective microcontrollers, the control unit is further provided.

User programs have been written into the program memory. More specifically, the programs include the encryption key A supplying program, the encryption key B generating program, the encrypting program and the comparing program (exclusive to the authenticating side). The program memory is classified into a case of a mask ROM and a case of a nonvolatile memory. The ID storage section has an ID storage section. For a specific customer, an ID inherent to a target customer is written to be shipped. In the ID storage section in a product shipped to an ordinary customer, an initial value, e.g., of all zeros is written. The ID storage section is readable but unrewritable from the user memory program. The ID storage section is a nonvolatile memory if the program memory is a nonvolatile memory with programs rewritable. The encryption key B generating program generates the encryption key B on the basis of the encryption key A and the ID. The CPU generates the random number. The encrypting program encrypts the random number based on the encryption key B. The comparing program compares the encrypted random number produced in the main body with the encrypted random number supplied from the accessory, and outputs the comparison result. The control unit is provided to be a component (exists) if the program memory is a nonvolatile memory. The control unit erases/writes the program memory in response to a write request. The ID held in the encryption key A supplying program is simultaneously initialized to, for example, all zeros.

The flow of the authentication process in the present invention is as described below.

Both the main body and the accessory initially generate the encryption key B by using the encryption key A and the ID. The main body generates the random number to output to the accessory. The main body encrypts the random number based on the encryption key B to obtain the first encrypted random number. The accessory encrypts the random number received from the main body based on the encryption key B, and generates the second encrypted random number to transmit to the main body. The main body compares the first encrypted random number with the second encrypted random number to output the comparison result.

When a program of a microcontroller is illegally acquired, a normal operation can be prevented even if a counterfeit product is used in which the illegally acquired program is written into a program memory. Therefore, it is possible to eliminate counterfeiting accessories by simply copying a program memory.

What is claimed is:

1. A microcontroller, comprising:
   a program memory configured to store a program group and a first encryption key;
   a CPU; and an identification (ID) storage section configured to store an identification data peculiar to a user of said microcontroller, wherein said CPU executes said program group to generate a second encryption key based on said identification data and said first encryption key and to encrypt a random number with said second encryption key.

2. The microcontroller according to claim 1, wherein said CPU executes a random number generating program of said program group to generate said random number.

3. The microcontroller according to claim 1, further comprising:

a random number generating circuit configured to generate said random number.

4. The microcontroller according to claim 1, further comprising:

a port configured to receive said random number.

5. The microcontroller according to claim 1, wherein said CPU executes said program group to compare said random number encrypted with said second encryption key and an encrypted random number received from an external device and to output the comparison result.

6. The microcontroller according to claim 1, wherein said program memory and said ID storage section are constituted by a nonvolatile memory.

7. The microcontroller according to claim 6, further comprising:

a control section configured to carry out an erasing operation and a writing operation to said program memory in response to a write request of a program into said program memory, and wherein said control section erases said identification data from said ID storage section when said erasing operation is carried out to said program memory.

8. The microcontroller according to claim 1, wherein said program group comprises:

a first encryption key supplying program adapted to supply said first encryption key;

a second encryption key generating program adaptive to acquire said first encryption key and said identification data and to generate said second encryption key based on said first encryption key and said identification data; and an encrypting program adapted to encrypt said random number with said second encryption key.

9. The microcontroller according to claim 8, wherein said program group further comprises:

a comparing program adapted to compare said random number encrypted using said second encryption key and an encrypted random number received from an external device and to output the comparison result.

10. An authentication method between first and second microcontrollers, said method comprising:

supplying a first encryption key through execution of a first encryption key supplying program stored in a first program memory of said first microcontroller;

holding a first identification data peculiar to said first microcontroller in a first identification (ID) storage section of said first microcontroller;

generating a second encryption key in said first microcontroller based on said first identification data and said first encryption key;

encrypting a random number with said second encryption key in said first microcontroller to generate a first encrypted random number;

receiving a second encrypted random number from said second microcontroller; and comparing said first encrypted random number and said second encrypted random number to output the comparing result.

11. The authentication method according to claim 10, further comprising:

reading said random number from said first program memory.

12. The authentication method according to claim 11 further comprising:

generating said random number to store in said first program memory.

13. The authentication method according to claim 12, wherein said generating said random number comprises:

executing a random number generating program stored in said first program memory to generate said random number.

14. The authentication method according to claim 10, wherein said program memory and said ID storage section are constituted by a nonvolatile memory, and said microcontroller further comprises:

carrying out an erasing operation and a writing operation to said first program memory in response to a write request of a program into said first program memory; and carrying out said erasing operation to said ID storage section in response to the write request.

15. The authentication method according to claim 10, further comprising:

supplying a third encryption key through execution of a second encryption key supplying program stored in a second program memory of said second microcontroller;

holding a second identification data peculiar to said second microcontroller in a second identification (ID) storage section of said second microcontroller;

generating a fourth encryption key in said second microcontroller based on said second identification data and said third encryption key;

encrypting said random number from said first microcontroller with said fourth encryption key in said second microcontroller to generate said second encrypted random number; and transmitting said second encrypted random number to said first microcontroller.

16. The authentication method according to claim 15, further comprising:

supplying power to said second microcontroller when a unit containing said second microcontroller is installed to a unit containing said first microcontroller, wherein said supplying a third encryption key is performed after the power is supplied to said second microcontroller.

17. The authentication method according to claim 10, further comprising:

supplying a third encryption key through execution of a second encryption key supplying program stored in a second program memory of said second microcontroller;

holding a second identification data peculiar to said second microcontroller in a second identification (ID) storage section of said second microcontroller;

generating a fourth encryption key in said second microcontroller based on said second identification data and said third encryption key;

encrypting said random number from said first microcontroller with said fourth encryption key in said second microcontroller to generate said second encrypted random number; and transmitting said second encrypted random number to said first microcontroller.

18. The authentication method according to claim 17, further comprising:
supplying power to said first microcontroller when a unit containing said second microcontroller is installed to a unit containing said first microcontroller,
wherein said supplying a first encryption key is performed after the power is supplied to said first microcontroller.

19. The authentication method according to claim 10, wherein said first identification data comprises a predetermined customer identifier.

20. The authentication method according to claim 10, wherein, when said first identification data is readable but unrewriteable from a user memory program.

* * * * *